United States Patent Office 3,489,967
Patented Jan. 13, 1970

3,489,967
PROPORTIONAL ACTION CONTROLLER WITH DERIVATIVE ACTION PART
Dietrich Hank, Leipzig, Germany, assignor to Veb Druckmaschinenwerke Leipzig, Leipzig, Germany, a corporation of Germany
Filed July 5, 1966, Ser. No. 562,598
Int. Cl. B65h 59/38
U.S. Cl. 318—6                                    5 Claims

ABSTRACT OF THE DISCLOSURE

A proportional action controller with derivative action part, for controlling a regulating unit, comprising at least one adjustable inductive transmitter means, a mechanically movable input member means adapted to be controlled by the valve of a factor to be regulated and operatively coupled to the at least one inductive transmitter means for dividing an A-C sum voltage into two partial voltages dependent upon the valve to be regulated, means for independently rectifying, in opposite direction of the flow of the current, the two partial voltages, two correcting networks each receiving one of the two rectified partial voltages, respectively, and each producing a corrected rectified signal, each of the correcting networks comprising a capacitor and a variable resistor connected in series and another variable resistor connected in parallel to said series connected capacitor and variable resistor, a transducer having two pairs of control coils, each pair connected to one of the correcting networks such that each of the corrected rectified signals having opposite directions of current flow influences the transducer in the same positive and negative direction, and the transducer further comprising an output coil operatively connected to the regulating unit.

---

The present invention relates to a proportional action controller with derivative action, comprising an amplifier in which the proportional action and the amplification, and also the rate of derivative action are adjustable or controllable.

In control engineering there are frequently used measuring elements, which have a more or less pronounced integral action and the signals of which are fed to the controller by proportionally-active transmitters. In the controller this integral-action signal must be transformed in known manner into the form and size required by the regulating unit, as a rule by producing a derivative-action part and amplifying the signal to a value which is sufficient for the actuation of the regulating unit. The integral action signal is differentiated as a rule by a corrective network and the signal obtained is thereupon amplified in a power amplifier.

In order to produce the derivative-action part of the signal, it is known to use RC networks as a conceding feedback in amplifiers, which can be only as voltage amplifiers, since the corresponding differentiation is not possible in practice in power amplifiers. In order to obtain a power sufficient for the actuation of regulating units, additional amplifiers and at least one further power amplifier must be connected behind the voltage amplifier. The use of a plurality of amplifiers is of course expensive.

It is furthermore known to arrange a simple RC network in the D-C current line of the regulating unit in the controller for generation of a derivative action. This arrangement requires a very excellently stabilized DC voltage from a source of electromotive force with low internal resistance for the actuation of the regulating unit. Due to its low voltage, galvanic cells are eliminated as electromotive sources, and in addition they have an unfeasibly large volume, if their internal resistance is to remain sufficiently low upon connection in series of a larger number of cells, in order to obtain a sufficiently high voltage. As a rule, generators of low internal resistance are used as sources of electromotive force.

As a rule alternating or three phase current is available for drive or control purposes. If controllers are energized with alternating current, then the required DC current must be produced in the controller itself in a rectifier with sufficiently low internal resistance from the feed alternating current. This can be brought about by means of controllable rectifiers and inverters. Ring demodulators can also be used, if their power is sufficient, or a corresponding amplification is provided. Due to the units required for the rectification and inversion or amplification and the means frequently required for the correction of the characteristics, the described control devices become uneconomical and subject to break-down.

If alternating currents are used as auxiliary energy for controllers and the regulating unit, then various usable voltage sources of low internal resistance are available, for instance transformers and inductive transmitters.

The production of the derivative-action part in the controller presupposes however a phase-dependent rectification of the alternating-current signal, the differentiating of the direct voltage in one or a plurality of RC networks and the remodulation of the transformed signal before its amplification in a power amplifier. The demodulation and the new modulation require a not inconsiderable amount of expense and are subject to disturbances.

There are furthermore known control devices for maintaining constant the pulling force of winch drives in which the armature current of the winch drive motors is maintained constant by means of a current-controlling magnetic amplifier, while by means of two voltage-responsive magnetic amplifiers (transducers) the field windings of the drive motors are influenced, so as to maintain the preset pulling force. These control devices can be used only in case of slow changes in pulling tension and do not afford the possibility of adding a derivative-action component to their proportional action. By the use of three magnetic amplifiers, the apparatus becomes relatively expensive.

Another control device for maintaining constant the pulling tension of winding devices is known, in which the difference between the induced voltage of the winch machine and a tachometer voltage proportional to the speed of rotation of the machine driving the material being wound, excites two magnetic amplifiers in a manner dependent on the direction, whereby one magnetic amplifier controls a variable resistor in the field circuit of the winch drive, in order to take the diameter of the coil into consideration, and the other magnetic amplifier actuates the motor of a variable resistor in the armature circuit of the tacho generator, in order to take any possible lead or lag into consideration.

In this arrangement, also two magnetic amplifiers and two servomotors must be used, in order to adjust very slowly occurring changes in the belt tension. It is not possible also in this control device, to add a derivative-action part to the proportional control, in order to control rapid changes in belt tension.

There is furthermore known a control system for maintaining a constant web tension by using a magnetic amplifier, which brakes with differential force an unwinding roller, either electromagnetically or inductively, in order to maintain constant the web tension. In the case of this device there is the disadvantage, that, on the one hand, it is rather very complicated mechanically, since rapid changes in web tension are taken up resiliently, and since, on the other hand, it permits only a direction-responsive derivative-action part for the rapid tightening of the loosened brake at the time of the change of the roll.

It is one object of the present invention to provide an amplifying proportional controller having a derivative-action part with adjustable amplification and adjustable proportional/rate action ratio, which comprises a simple, robust control device which can easily be adapted to the existing conditions, does not have the disadvantages described above and satisfies the object of regulating both slow and also rapid deviations of an actual value from a given value in both directions with adjustable time behavior and supplies a DC voltage as operating voltage for the regulating unit.

It is another object of the present invention to provide an amplifying proportional action controller having a derivative-action part with adjustable amplification and adjustable proportional/derivative action ratio, having a mechanical input, controlled by the actual value of a factor (quantity) to be influenced by the controller such, that the mechanical input movement causes the generation of two part voltages in two inductive transmitters with constant sum voltage, and the part voltages operate in opposite direction symmetrically relative to each other, or else actuates movement of a sliding wiper of an inductive transmitter having several windings with a constant sum voltage, such that the individual AC-voltage parts of the sum voltage changes in opposite directions and the individual AC-voltage parts are rectified by means of separate rectifiers and the direct currents will be fed in opposite flow of currents over correction networks for generation of the derivative-action part to two control windings of a magnetic amplifier, so that negative pulses emitted from a correction network are fed to the magnetic amplifier with negative current direction, while at the same time the positive pulse with positive flow direction emitted from the other correction network influences the magnetic amplifier in the same direction.

As transmitters operating in opposite directions symmetrically to each other, there can be used the most different devices, for instance so-called inductive position transmitters, and also differential transformers with adjustable core, which may also consist of two individual inductors with individual cores adjustable in opposite directions by means of a lever system, or else two inductors arranged at right angles to each other, which are energized at different strengths by a primary inductor arranged swingably disposed at its point of intersection in accordance with the position of the swingable inductor (rotary transformers), or else similar devices. Depending upon the circumstances, two inductors controlled individually and in opposite directions, or one inductor with differential winding can be used.

There has been found particularly advantageous the use of a variable transformer, the wiper of which taps off partial voltages as different parts of the constant sum voltage, depending on its position which partial voltages are fed separately over rectifiers and in an opposite flow of currents over correction networks to two control windings of a transducer, such that the transducer is controlled in the same direction by each of both opposite voltages.

One particularly suitable further development of the present invention for controlling additional disturbance variables is possible such, that by their transmitter the feedback of the magnetic amplifier or the feed voltage of the variable transformer will be changed.

This possibility can be utilized, for instance, when the amplification of the magnetic amplifier is to be controlled as a function of another physical magnitude, for instance, a speed of rotation. In such case an alternating voltage, which is proportional to the speed of rotation coinciding in phase and frequency with the variable-transformer voltage, or by means of a rectifier a corresponding DC voltage, that can be switched in opposition to the variable transformer voltage, so that the desired dependence of the amplification upon the speed of rotation is obtained.

With these and other objects in view which will become apparent in the following detailed description, the present invention will be clearly understood in connection with the accompanying drawings in which.

Figure 1:
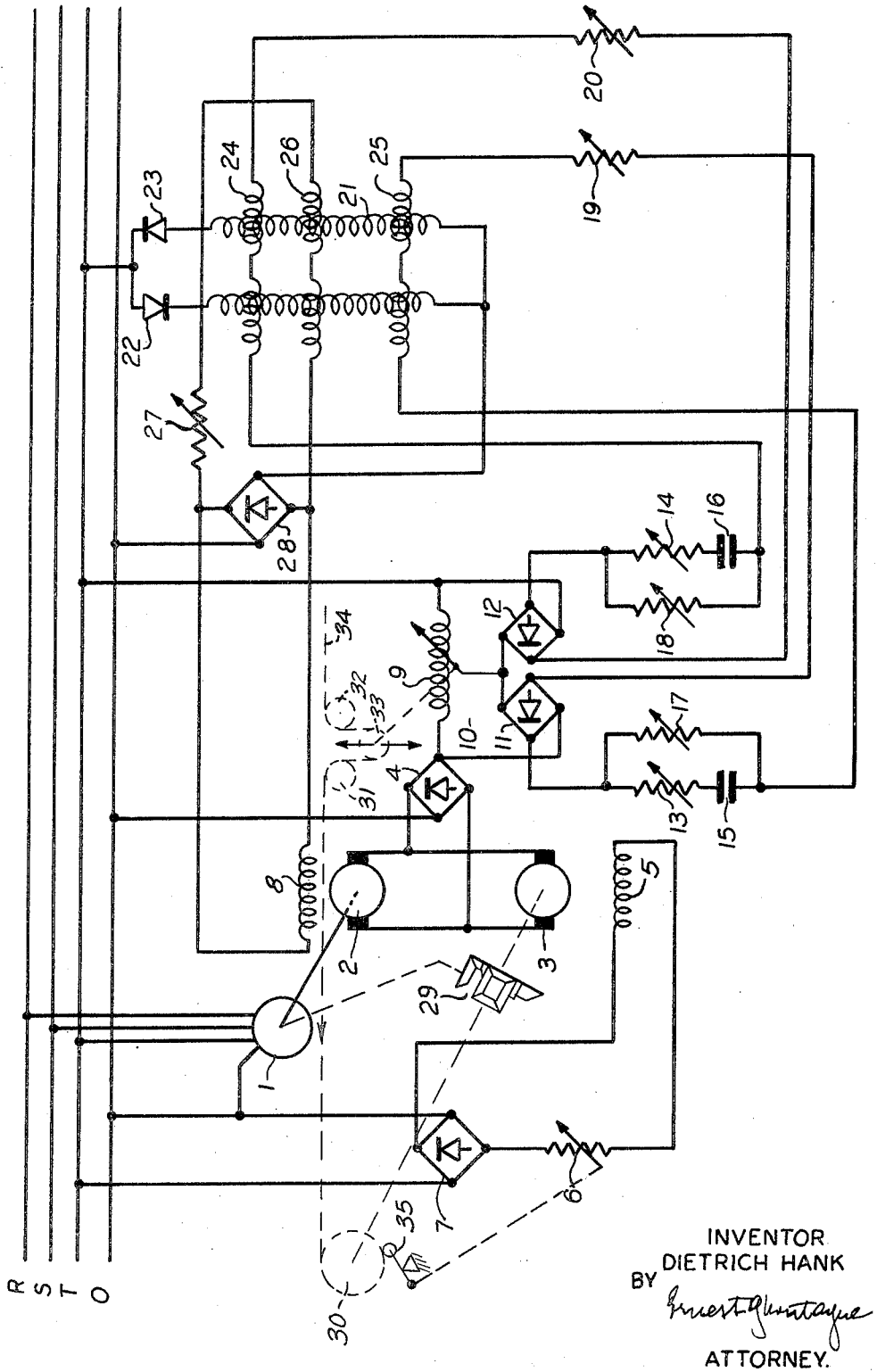
FIG. 1 is a circuit of the present invention.

This embodiment is based on the application of the controller, a well known paper-web winding device, in which a processing machine for the paper web, for instance a printing machine, will drive a tachogenerator to produce a voltage which is proportional to the speed of rotation, as well as a differential drive having a secondary drive for the winding device and another secondary drive for a brake generator, the braking moment of which is controlled in dependency of the speed of winding and of the tension of the paper web, respectively, on the one hand, and the winding diameter, on the other hand.

A main motor 1, which drives a processing machine (not shown) drives also a tachogenerator 2, the armature of which is disposed in parallel to the armature of a brake generator 3. The main motor 1 also drives a differential-axle-drive bevel gear of a differential gearing 29, the secondary drives of which are connected with the brake generator 3 and the reel 30. If the brake generator 3 is blocked, the main motor 1 drives the reel 30 too fast, causing web tension to rise and the dancer roller 33 to move upwardly. The movement of the dancer roller 33 is transmitted to the input of the controllers in a manner as described below. If the brake generator 3 runs with the speed of rotation of the main motor 1, reel 30 is stopped and there is no web tension. As a consequence, the dancer roller 33 moves downwardly. Changing the speed of rotation of the brake generator 3 therefore effects changing the tension of web 34. A rectifier 4, the function of which will be described below, is disposed in parallel to the armatures. The brake generator field 5 is disposed above a variable resistor 6, which is automatically adjusted in dependency upon the diameter of the obtained winding by a gauge roller 35, and a rectifier 7 is disposed on the alternating current network supplying the field 5 of the brake generator with DC. The field 8 of the tachogenerator 2 is controlled in a manner, to be explained below, whereby the armature voltage of the brake generator 3, and thus the speed of rotation of the latter is changed. The web 34, being wound upon a reel 30, passes a dancer roller 33, which gives the input signal to the controller. The parts described up to now are known per se and do not form an essential part of the present invention.

The measurement of the difference of the speed of the paper web 34 between unwinding and winding is effected in known manner by means of the dancer roller 33 between rollers 31 and 32, which varies the position of a wiper 10 of a regulating transformer 9. By the wiper 10 two individual part AC voltages are tapped off from the regulating-transformer voltage, which at first is assumed to be constant, each of the voltages being rectified individually by means of rectifiers 11 and 12, respectively, and fed to a correction network consisting of variable resistors 13 and 14, respectively and capacitors 15 and 16, respectively, connected in series to which variable resistors 17 and 18, respectively are disposed in parallel, and additional variable resistors 19 and 20, respectively, to control coils 24 and 25, respectively, of a transducer 21. The saturation coils of transducer 21 are connected with the feed line T of the network R, S, T, O by means of diodes 22 and 23. The elements designated in each case with even position numbers and with odd position numbers, respectively, belong to a separate control circuit; the two control circuits influence the transducer 21 in the same direction upon opposite directions of flow of the control current.

A change in the position of the wiper 10 of the variable transformer 9 effects a change of the value of the individual DC voltages on the rectifiers 11 and 12 in opposite directions. By the correction members, resistor 13, capacitor 15, and resistor 14, capacitor 16, respectively, there is added to the control direct voltage, the derivative action part (rate-action part), the value and delay of which can be adjusted independently at the variable resistors 13 and 14, respectively, for each change in direction of control DC. Therefore it is possible to adjust the derivative-action parts independently for each direction of movement of the wiper 10 or the dancer roller 33, respectively. The abrupt increase of web tension, moving the dancer roller 33 upwardly and the wiper 10 to the right, respectively, therefore can be controlled with another time behaviour than an abrupt decrease of web tension, effecting a movement of the wiper to the left. Due to the rectifiers 11 and 12, the directions of current flow in the two branches through the coils 24 and 25, respectively, are always equal and opposite to each other. The variable resistors 17 and 18 which are disposed in parallel with the correction members 13, 15 and 14, 16, respectively, permit to adjust the proportional action and derivative-action of the two control branches independently of each other; by means of the variable resistors 19 and 20, the proportional action and the delay of the two control branches can be adjusted independently of each other.

The DC output voltage of the transducer 21 is supplied by means of a rectifier 28 to the field 8 of the tachogenerator 2. The output voltage is fed back by means of the same rectifier 28 into a coil 26 of the transducer 21; in this connection the amplification can be adjusted with a variable resistor 27 by changing the feedback.

By the voltage of the field 8 of the tachogenerator 2, the armature current of the tachogenerator 2 is influenced, in known manner, and therefore also of the brake generator 3, further influencing of the armature current is afforded by the speed of rotation of the drive motor 1, and thereby of the speed of tachogenerator 2. The output coil 26 of the transducer feeds its DC-control voltage to the field 8 of the tachogenerator 2 and therefore the DC-voltage and DC-current, respectively, of the armatures of the tachogenerator 2 and of the brake generator 3 also change. If the web tension rises, the dancer roller 33 will go upwardly, and the DC-voltage of the field 8 of the tachogenerator 2 also rises, due to the output of transducer 21. Therefore the armature current through the tachogenerator 2 and the brake generator 3 falls and the speed of rotation of the latter also rises. The reel 30 will be driven slower by the main motor 1 and the web tension falls once more. If the web tension falls, the dancer roller 33 will move downwardly, moving the wiper 10 to the left and therefore the DC-output voltage of output coil 26 of the transducer 21 and the DC-voltage of the field 8 of the tachogenerator 2 falls. This causes an increase in the armature DC-current of the tachogenerator 2 and brake generator 3, respectively, and its speed of rotation falls, consequently the reel 30 will be driven faster and the web tension rises again.

An influencing of the control device dependent upon the speed of rotation is obtained such, that to the feed alternating voltage of the variable transformer 9 there is connected in opposition by means of the rectifier 4 a direct voltage dependent upon the value of the armature voltage of the tachogenerator 2 and of the brake generator 3, respectively.

Figure 2:
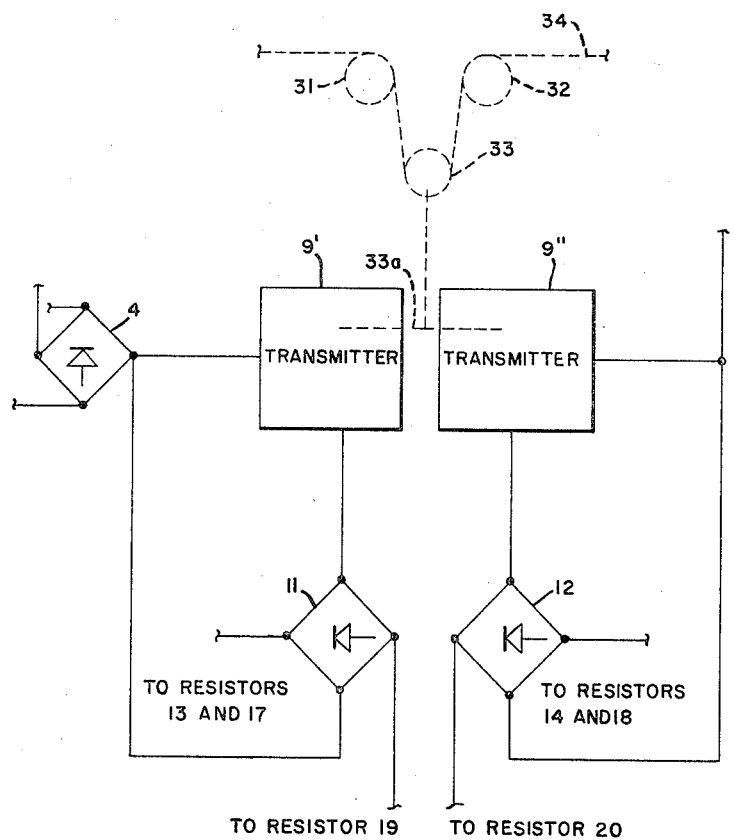
FIG. 2 is a circuit partially broken away, showing an alternate embodiment of the present invention.

As an alternative to the single inductive transmitter 9 having several windings, two inductive transmitters 9' and 9" (FIG. 2) may be provided with constant sum voltage, the voltages of each operating in opposite directions symmetrically relative to each other.

As transmitters operating in opposite directions symmetrically to each other, there can be used the most different devices, for instance so-called inductive position transmitters, and also differential transformers with adjustable core, which may also consist of two individual inductors with individual cores adjustable in opposite directions by means of a lever system 33a, or else two inductors arranged at right angles to each other, which are energized at different strengths by a primary inductor arranged swingably disposed at its point of intersection in accordance with the position of the swingable inductor (rotary transformers), or else similar devices. Depending upon the circumstances, two inductors controlled individually and in opposite directions, or one inductor with differential winding can be used.

While I have disclosed one embodiment of the present invention, it is to be understood that this embodiment is given by example only and not in a limiting sense, the scope of the present invention being determined by the objects and the claims.

I claim:

1. A proportional action controller with derivative action part, for controlling a regulating unit, comprising
    at least one adjustable inductive transmitter means,
    a mechanically movable input member means adapted to be controlled by the value of a factor to be regulated and operatively coupled to said at least one inductive transmitter means for dividing an A-C sum voltage into two partial voltages dependent upon said value to be regulated,
    means for independently rectifying, in opposite direction of the flow of current, said two partial voltages,
    two correcting networks each receiving one of said two rectified partial voltages, respectively, and each producing a correcting rectified signal,
    each of said correcting networks comprising a capacitor and a variable resistor connected in series and another variable resistor connected in parallel to said series connected capacitor and variable resistor,
    a transducer having two pairs of control coils, each pair connected to one of said correcting networks such that each of said correcting rectified signals having opposite directions of current flow influences said transducer in the same manner, and
    said transducer further comprising an output coil operatively connected to said regulating unit.

2. The controller, as set forth in claim 1, wherein said adjustable inductive transmitter is differentially operating.

3. The controller, as set forth in claim 1, wherein two inductive transmitters are provided, which operate in opposite directions symmetrically relative to each other.

4. The controller, as set forth in claim 1, wherein said at least one adjustable inductive transmitter means comprises,
    a regulating transformer having a wiper, and said wiper being said mechanically movable input member and said wiper divides the sum voltage of said regulating transformer into said two partial voltages dependent as to their value upon the actual value of said factor to be regulated by the controller.

5. The controller, as set forth in claim 4, which includes
means for adjusting the sum voltage of said regulating transformer.

References Cited

UNITED STATES PATENTS 2,722,639  11/1955  Shaad et al. _____ 318—6
3,060,358  10/1962  Peeples et al. _____ 318—16

FOREIGN PATENTS 643,537  9/1950  Great Britain.
708,075  4/1954  Great Britain.

ORIS L. RADER, Primary Examiner
L. L. HEWITT, Assistant Examiner

U.S. Cl. X.R.
242—75; 318—327

UNITED STATES PATENT OFFICE
CERTIFICATE OF CORRECTION

Patent No. 3,489,967      Dated January 13, 1970

Inventor(s) Dietrich Hank

It is certified that error appears in the above-identified patent and that said Letters Patent are hereby corrected as shown below:

In the heading of the patent specification, line 3 for "Dietrich Hank, Leipzig, Germany, assignor to Veb Druck-"

read -- Dietrich Hank, Leipzig, Germany, assignor to VEB Druck- --

SIGNED AND
SEALED
JUL 14 1970

(SEAL)
Attest:

Edward M. Fletcher, Jr.
Attesting Officer

WILLIAM E. SCHUYLER, JR.
Commissioner of Patents